United States Patent
Sampson

(10) Patent No.: US 6,836,749 B1
(45) Date of Patent: Dec. 28, 2004

(54) METHOD OF TRACKING MACHINE BREAKDOWN

(75) Inventor: Jeffrey R. Sampson, Belleville, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/565,952

(22) Filed: May 5, 2000

(51) Int. Cl.⁷ .............................................. G06F 15/18
(52) U.S. Cl. ...................... 702/184; 702/122; 702/113; 702/180; 702/182; 702/183; 702/185
(58) Field of Search ................................. 702/113, 122, 702/125, 180, 182–185, 187, 188, 196; FOR 134–137, FOR 154–155, FOR 162; 714/2, 201, 25, 301, 31, 37, 40, 45–48.57, 30; 340/3.1; 342/57, 58; 760/78, 79, 21, 110; 700/174, 115–117, 177, 78, 79, 21, 110; 705/8–9

(56) References Cited

U.S. PATENT DOCUMENTS

| | | | | |
|---|---|---|---|---|
| 4,985,857 A | * | 1/1991 | Bajpai et al. | 702/184 |
| 5,754,965 A | * | 5/1998 | Hagenbuch | 701/35 |
| 5,845,272 A | * | 12/1998 | Morjaria et al. | 706/50 |
| 6,115,489 A | * | 9/2000 | Gupta et al. | 382/141 |
| 6,324,659 B1 | * | 11/2001 | Pierro | 714/48 |
| 6,411,908 B1 | * | 6/2002 | Talbott | 702/34 |
| 6,473,659 B1 | * | 10/2002 | Shah et al. | 700/79 |
| 6,501,849 B1 | * | 12/2002 | Gupta et al. | 382/141 |
| 6,546,363 B1 | * | 4/2003 | Hagenbuch | 703/7 |
| 6,598,011 B1 | * | 7/2003 | Koritzinsky et al. | 702/185 |
| 6,625,589 B1 | * | 9/2003 | Varma et al. | 706/45 |
| 2002/0032544 A1 | * | 3/2002 | Reid et al. | 702/183 |

* cited by examiner

*Primary Examiner*—Marc S. Hoff
*Assistant Examiner*—Carol S. W. T.
(74) *Attorney, Agent, or Firm*—David B. Kelley

(57) ABSTRACT

A method of tracking machine breakdown (10) comprising, listing each breakdown relative to a first machine (20) and listing the corrective action taken on the first machine relative to each of the breakdowns (30).

14 Claims, 3 Drawing Sheets

METHOD OF TRACKING MACHINE BREAKDOWN

TECHNICAL FIELD

The present invention relates to a method of tracking machine breakdown and more particularly to a method of tracking machine breakdown that additionally tracks corrective action.

BACKGROUND ART

Manufacturing plants often utilize complex machinery in the production and assembly of products. Often there may be present a wide variety of different machines for accomplishing various tasks within the plant environment. These machines within the plant environment can be susceptible to breakdown, which may result from physical failure of part of the machine, a malfunction in the machine's performance, a failure to properly operate the machine, or a wide variety of other known factors. When a machine within the manufacturing plant breaks down, the result can be improper product construction or assembly, delays in production, or production stoppage. All of these results are highly undesirable since they can lead to increased production costs, increased production times, and decreased customer satisfaction.

It is known that machine breakdown may be tracked in order to produce an operating history of individual machines within the manufacturing plant. This process is known to be highly useful in predicting the reliability and cost of individual machines. Commonly, however, such methods do not provide a useful method of preventing or dealing with future machine breakdowns. Since present systems do not track the corrective action taken in response to a given breakdown, present systems must typically rely on the knowledge of plant personnel to properly deal with and prevent future machine breakdown. Due to the nature of human memory and the possibility of changes in plant personnel, such systems can be inefficient and unreliable. It would be highly desirable to have a system of tracking machine breakdowns that additionally provides an efficient and reliable way to deal with and prevent future machine breakdowns.

In addition to the described limitations of present systems, present systems track breakdowns in relation to specific machines within the manufacturing plant. This limited form of tracking can be inefficient for additional reasons. Present systems often fail to consider that different machines within the plant may share similar mechanisms, functions, or controls. A breakdown of one machine within the plant may provide valuable information in dealing with or preventing breakdowns in machines with similar mechanisms, functions, or controls. The corrective action taken in response to one machine's breakdown may be directly applicable to other machines within the manufacturing plant. Present systems often rely on the knowledge of plant personnel to mentally make such connections between machinery and to insure that corrective action is properly taken on each machine. Again, such a reliance on human memory is inefficient and unreliable. It would be highly desirable to have a method to help insure that corrective action taken on one machine within the plant is taken on other machines with similar mechanisms, functions, or controls such that breakdowns in the similar machines can either be prevented or dealt with in a quick, efficient, and reliable manner.

SUMMARY OF THE INVENTION

It is therefore an object of the present invention to provide an improved method of tracking machine breakdown.

In accordance with the object of this invention a method of tracking machine breakdown is provided. The method of tracking machine breakdown includes listing each breakdown relative to a first machine. The method further includes listing the corrective action taken on the first machine relative to each of the breakdowns. In this fashion, a list of corrective actions is developed relative to each breakdown. When a future breakdown occurs, a corresponding corrective action can be quickly, efficiently, and reliably identified if the breakdown has occurred in the past. In addition, the identified corrective action may be instituted as prevention against future breakdowns before they occur.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
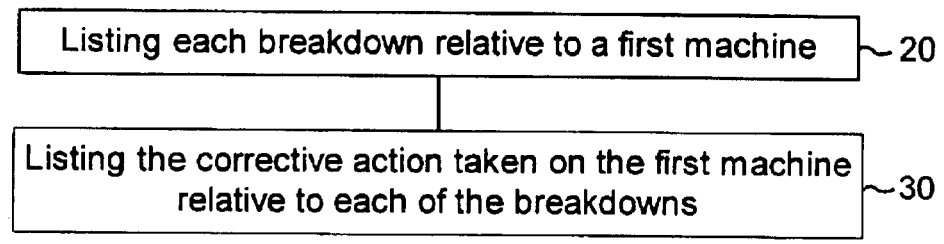
FIG. 1 is a flowchart illustrating a method of tracking machine breakdown in accordance with the present invention.

Referring now to FIG. 1, which is a flowchart illustrating an embodiment of a method of tracking machine breakdown 10 in accordance with the present invention. The method of tracking machine breakdown 10 is intended for use in a wide variety of industries and applications. In one embodiment, the method of tracking machine breakdown 10 is intended for use in an automotive assembly plant. Other embodiments, however, including non-automotive applications are contemplated.

The method of tracking machine breakdown 10 is comprised of listing each breakdown relative to a first machine 20. Machine breakdowns are well known in the art. In one example, a machine breakdown may be due to parts or components within the machine failing. In another example, the machine breakdown may be due to the machine operating outside of prescribed tolerances. Operating tolerances are well known in the manufacturing industry and may consist of a wide variety of limitations on machine operation such as range of motion, force applied by the machine, and material dispensed by the machine. Obviously a wide range of other tolerances are known and can contribute to machine failure if they are not satisfied. In still another example, the breakdown may occur when the machine malfunctions. A machine typically malfunctions when it operates in a fashion not intended during normal operation. Machine malfunctions are also well known in the manufacturing industry and may consist of a wide variety of unintended machine functions that can vary with the type and function of machine involved. Although several forms of machine breakdowns have been discussed, a wide variety of breakdowns are contemplated. The very diverse nature of machines within different manufacturing environments makes a complete description of all possible breakdowns virtually impossible, but the concept is well understood in all manufacturing industries.

When a breakdown occurs within a manufacturing plant, corrective action is commonly taken on the machine in question. The corrective action can consist of any method of compensating for the breakdown in the machine. In some circumstances, the corrective action may be replacing a broken part or component within the machine. In other circumstances routine inspection of components or parts may be the corrective action so that such parts can be replaced or adjusted as they become worn. In still other circumstances, the machine itself may be adjusted or reconfigured to compensate for the part failure or malfunction. Although several corrective actions have been described, a vast array of corrective actions are contemplated and understood within the manufacturing industry.

The method of tracking machine breakdown 10 is further comprised of listing the corrective action taken on the first machine relative to each of the breakdowns 30. By listing not only the breakdowns experienced by each machine but the corrective action taken in response to the breakdowns, the present 41 invention provides an improvement over the prior art by creating a quick and reliable reference of corrective actions appropriate for a machine breakdown. In this fashion, the listing of corrective actions provides a quick, efficient, and reliable method of dealing with and preventing future machine breakdowns. A plant operator utilizing this method is provided with more than simply a guide towards the reliability and cost of a particular machine, but with a practical guide to keeping the machine running properly.

Figure 2:
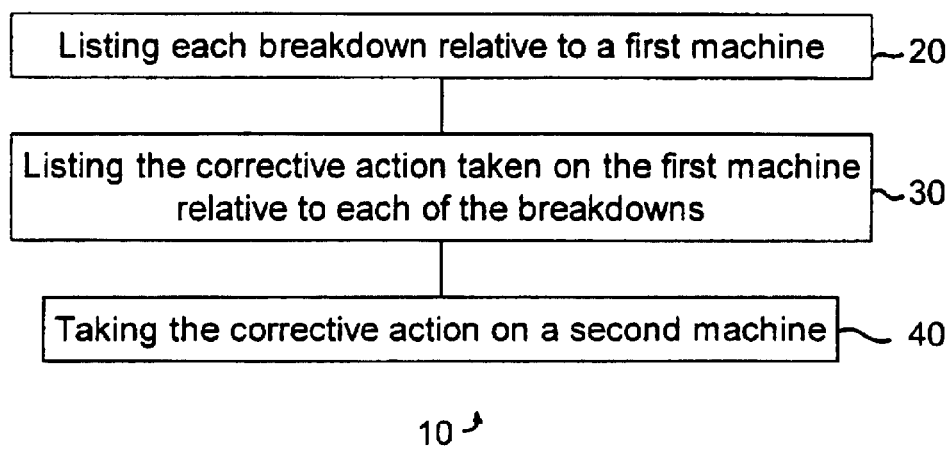
FIG. 2 is a flowchart illustrating a method of tracking machine breakdown in accordance with the present invention.

Referring now to FIG. 2, which is a flowchart illustrating an embodiment of a method of tracking machine breakdown 10 in accordance with the present invention. In this embodiment, the method of tracking machine breakdown 10 comprises listing each breakdown relative to a first machine 20, listing the corrective action taken on the first machine relative to each of the breakdowns 30, and taking the corrective action on a second machine 40. By utilizing the list of corrective actions, a plant operator or manager can not only find appropriate methods of treating and preventing the future breakdown of a specific machine, but may find appropriate methods of treating and preventing the future breakdown of similar or related machines. Machines may be similar or related if they share similar components, similar controls, or similar function. In one example, a pulley within a machine fails and is replaced with a pulley of a stronger material. With the listing of the breakdown and a corresponding corrective action, a pulley in a similar machine may also be replaced, such that the breakdown experienced by the first machine is thereby prevented in the second machine. In another example, when a first machines does not stamp parts properly, it may be discovered that the hydraulic line within the machine is faulty and needs replaced. Later when a second machine does not stamp parts properly, the listed corrective action can be utilized to check and possibly replace the hydraulic line on the second machine. Although two examples were described, a wide variety of potential uses for the present invention are possible.

Figure 3:
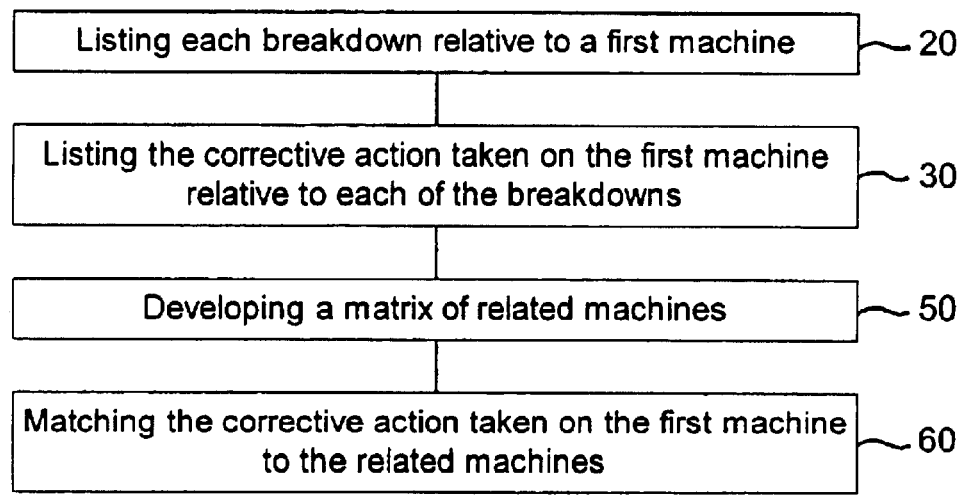
FIG. 3 is a flowchart illustrating a method of tracking machine breakdown in accordance with the present invention.

Referring now to FIG. 3, which is a flowchart illustrating an embodiment of a method of tracking machine breakdown 10 in accordance with the present invention. In this embodiment, the method of tracking machine breakdown 10 comprises listing each breakdown relative to a first machine 20, listing the corrective action taken on the first machine relative to each of the breakdowns 30, developing a matrix of related machine 50, and matching the corrective action taken on the first machine to the related machine 60. In this embodiment, instead of relying on plant personnel to know what other machines a given corrective action maybe appropriate for, a matrix of related machines is developed.

The matrix comprises a list of machines with similar characteristics or parts. These may be a wide variety of characteristics including similar makes, manufacturers, functions, controls, or components to name just a few. In this way, when a breakdown and a corresponding corrective action are listed, the corrective action is directly matched not only to the first machine experiencing the breakdown, but to every machine containing the characteristic effected by the corrective action. In this way, the listing of breakdowns and corrective actions can be better utilized to improve the efficiency and reliability of groups of machines. In one example, when a valve is found to continually fail due to poor construction, when the corrective action is taken on a first machine, the corrective action is matched to every machine containing the same valve. In this fashion, the plant operator has the option of replacing each valve and thereby heading off future breakdowns, or when such breakdowns occur having a solution quickly, efficiently, and reliably available to him.

While particular embodiments of the invention have been shown and described, numerous variations and alternate embodiments will occur to those skilled in art. Accordingly, it is intended that the invention be limited only in terms of the appended claims.

What is claimed is:

1. A method of tracking machine breakdown comprising:
listing each breakdown relative to a first machine;
listing the corrective action taken on said first machine relative to each of said breakdowns;
developing a matrix of related machines prior to said breakdowns, said matrix including similar characteristics between said related machines;
determining a second machine related to said first machine by way of at least one characteristic using matrix, said at least one characteristic related to said breakdown, said second machine physically distinct and not identical to said first machine; and
taking said corrective action on said second machine prior to said second machine breaking down.

2. A method of tracking machine breakdown as described in claim 1, wherein said breakdowns include part failure.

3. A method of tracking machine breakdown as described in claim 1, wherein said breakdowns include said first machine operating out of tolerances.

4. A method of tracking machine breakdown as described in claim 1, wherein said breakdowns include said first machine malfunctioning.

5. A method of tracking machine breakdown as described in claim 1, wherein said corrective action includes replacing a part on said first machine.

6. A method of tracking machine breakdown as described in claim 1, wherein said corrective action includes adjustments to controls on said first machine.

7. A method of tracking machine breakdown as described in claim 1, wherein said corrective action includes modification of said first machine.

8. A method of tracking machine breakdown as described in claim 1, wherein said second machine and said first machine are related by contain similar parts.

9. A method of tracking machine breakdown as described in claim 1, wherein said second machine and said first machine are related by having similar functions.

10. A method of tracking machine breakdown as described in claim 1, wherein said second machine and said first machine are related by having similar controls.

11. A method of tracking machine breakdown comprising:

listing each breakdown relative to a first machine;

listing the corrective action taken on said first machine relative to each of said breakdowns;

developing a matrix of related machines prior to said breakdowns, said matrix including similar characteristics between said related machines; and matching said corrective action, taken on said first machine, to said related machines with said similar characteristics.

12. A method of tracking machine breakdown as described in claim 11, wherein said related machines include machines with similar parts as said first machine.

13. A method of tracking machine breakdown as described in claim 11, wherein said related machines include machines with similar functions as said first machine.

14. A method of tracking machine breakdown as described in claim 11, wherein said related machines include machines with similar controls as said first machine.

* * * * *